United States Patent [19]
Krebs

[11] Patent Number: 5,318,184
[45] Date of Patent: Jun. 7, 1994

[54] SLUDGE DRYING SYSTEM

[76] Inventor: Georg Krebs, Eschbacher Str. 19, D-7890 Waldshut 1, Fed. Rep. of Germany

[21] Appl. No.: 941,574

[22] Filed: Sep. 10, 1992

[51] Int. Cl.$^5$ .............................................. B07B 9/00
[52] U.S. Cl. ................................. 209/21; 209/3; 209/552; 209/680; 209/682; 209/238; 209/314; 209/391; 209/930
[58] Field of Search ................ 34/11; 209/3, 11, 21, 209/552, 657, 680, 682, 238, 314, 317, 391, 392, 930

[56] References Cited

U.S. PATENT DOCUMENTS

| | | | |
|---|---|---|---|
| 527,333 | 10/1894 | Humbert | 209/391 X |
| 996,774 | 7/1911 | Kohlmann | 209/391 |
| 1,820,944 | 9/1931 | Marx | 209/391 |
| 1,915,240 | 6/1933 | Putnam | 210/667 |
| 2,090,187 | 8/1937 | Credo | 34/24 |
| 2,102,427 | 12/1937 | Lloyd et al. | 110/8 |
| 2,191,322 | 2/1940 | Matthews | 209/391 X |
| 2,977,214 | 3/1961 | McLellan | 71/64 |
| 3,025,151 | 3/1962 | Berg et al. | 71/9 |
| 3,342,731 | 9/1967 | Baumann et al. | 210/45 |
| 3,410,233 | 11/1968 | Seiler | 110/15 |
| 3,548,510 | 12/1970 | Nakai et al. | 34/19 |
| 3,707,774 | 1/1973 | Eise et al. | 34/14 |
| 3,864,841 | 2/1975 | McGehee | 34/11 |
| 3,954,069 | 5/1976 | Loken | 110/8 R |
| 3,963,471 | 6/1976 | Hampton | 71/12 |
| 4,040,190 | 8/1977 | van den Broek | 34/11 |
| 4,130,945 | 12/1978 | Brachthäuser | 34/10 |
| 4,153,411 | 5/1979 | Isheim | 432/27 |
| 4,215,637 | 8/1980 | Lombana | 110/225 |
| 4,245,396 | 1/1981 | Maffet | 34/12 |
| 4,357,152 | 11/1982 | Duske et al. | 55/257 C |
| 4,429,643 | 2/1984 | Mulholland | 110/238 |
| 4,558,525 | 12/1985 | Duske et al. | 34/128 |
| 4,761,893 | 8/1988 | Glorioso | 34/11 |
| 4,829,678 | 5/1989 | Glorioso | 34/11 |
| 4,852,269 | 8/1989 | Glorioso | 34/11 |
| 4,860,671 | 8/1989 | Glorioso | 110/236 |
| 4,901,654 | 2/1990 | Albertson et al. | 110/346 |
| 4,926,764 | 5/1990 | van den Broek | 110/221 |
| 4,953,478 | 9/1990 | Glorioso | 110/215 |
| 4,956,926 | 9/1990 | Glorioso | 34/11 |
| 4,989,344 | 2/1991 | Glorioso | 34/11 |
| 5,069,801 | 12/1991 | Girovich | 210/770 |

FOREIGN PATENT DOCUMENTS 53-12551 2/1978 Japan.
7046 2/1900 United Kingdom.

OTHER PUBLICATIONS

TCW Brochure-Recycling of Organic Waste, 1984.
Knapp, "City Reaps Income from Sludge Processing System", Public Works, Oct. 1977, pp. 103-105 & 118.
U. Keller, VSA-Dokumentation, "Klarschlamm behandein", Jan. 29 & 30, 1981, pp. 8.0-8.78.

*Primary Examiner*—Robert P. Olszewski
*Assistant Examiner*—Dean A. Reichard
*Attorney, Agent, or Firm*—Roylance, Abrams, Berdo & Goodman

[57] ABSTRACT

A sludge drying system using exhaust air from a furnace in a direct heat, rotary drum dryer to simultaneously dry and pelletize the sludge. The dried sludge particles exiting the dryer is entrained in the exhaust air. The sludge particles are separated from the exhaust air and then classified according to size. The under sized particles are recycled back to a mixer for mixing with incoming wet sludge. The oversized particles are conveyed to a crusher or mill for reducing the oversized particles down to the desired product size. The medium-sized particles can be selectively directed to be recycled with the undersized particles or collected as product. The exhaust air is treated in a treatment section, and then divided into two exhaust air streams or portions. A first portion of the exhaust air is discharged into the environment, while the second, larger portion of the exhaust air is recycled back to the furnace to be used to dry the sludge in the drier.

30 Claims, 5 Drawing Sheets

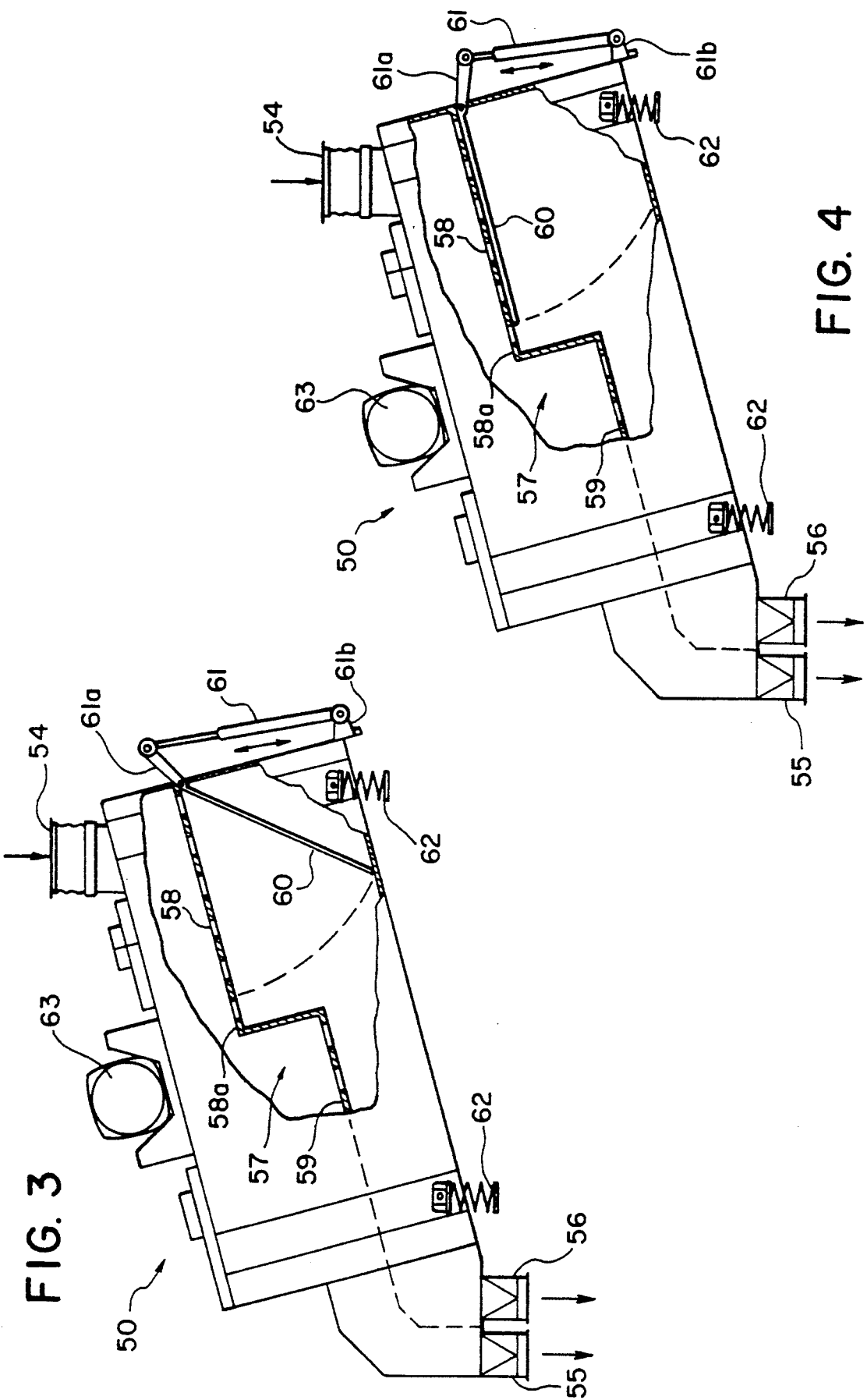

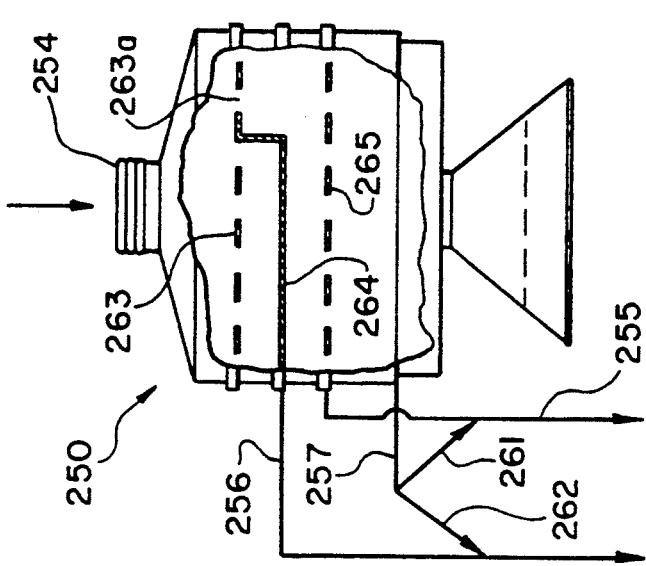
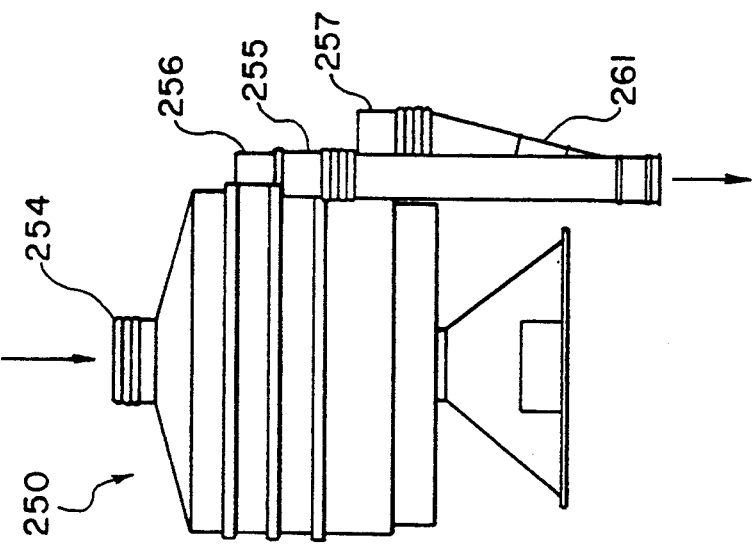
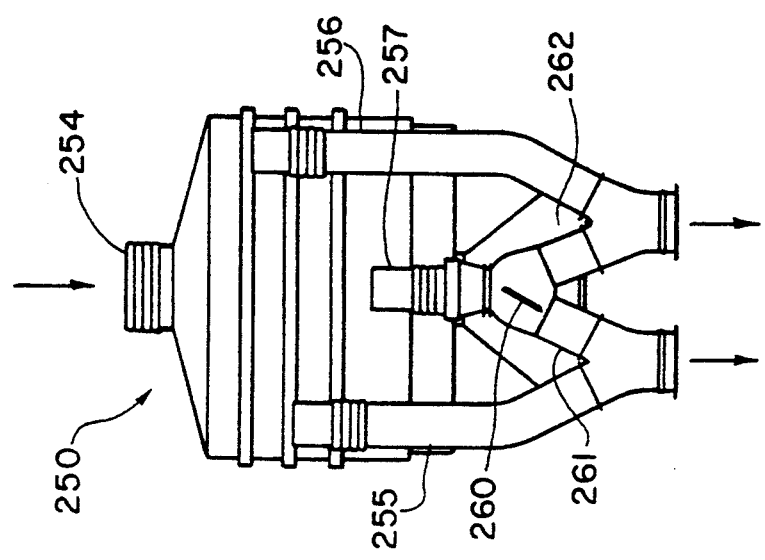

SLUDGE DRYING SYSTEM

BACKGROUND OF THE INVENTION

1. Field of the Invention

This invention relates to thermally treating mechanically dewatered sludge from municipal wastewater treatment plants, pulp and paper mills, oil refineries, food processing plants, or pharmaceutical manufacturing plants for removing water from fibrous suspensions. More specifically, this invention relates to a sludge drying system for producing granular particles or pellets to be used as fertilizer, and to a classifying system for pellet separation.

2. Description of the Prior Art

Typically, sludge from a municipal wastewater treatment plant or paper mill is first mechanically dewatered. The mechanically dewatered sludge is then fed to a sludge drying plant which utilizes heated air in a rotating drying drum. Dried sludge is pelletized and can be either sold as fertilizer or disposed of as permitted by restricting regulations.

Many processes have been proposed for thermally treating mechanically dewatered sewage sludge in a drying system. One such process is described in VSA - Dokumentation, "Klarschlammbehandeln" by U. Keller (1981) in which large or oversized dried sludge pellets are crushed and mixed with the undersized pellets, and then recycled for mixture with incoming dewatered sludge. This process has the drawback that large quantities of oversized pellets are crushed into smaller size particles or fines which are then recycled. This process requires high energy input for the crusher and also for the transporting devices. Also this large quantity of crushed sludge particles has to be heated in the dryer which also results in an increase energy consumption for the entire system.

This invention addresses these problems in the art as well as other problems in the art which will be apparent to those skilled in the art once given this disclosure.

SUMMARY OF THE INVENTION

Surprisingly, it has been found that a sludge drying system for producing pellets can be efficiently operated without grinding and recycling oversized particles, but by recycling only fine or undersized particles and periodic doses of medium-sized particles.

A sludge drying system in accordance with the present invention, comprises a thermal dryer for drying a sludge mixture of dried sludge particles and wet sludge into dried particulate matter, the thermal dryer having an inlet and an outlet; a gas-solid separator for receiving dried particulate matter and off gases from the outlet of the dryer and for separating a substantial portion of the dried particulate matter from the off gases; a sieve for separating the dried particulate matter by size into a recycled portion of fine and medium-sized particles and a collected portion of large and medium-sized particles, and mixer for mixing incoming wet sludge with the recycled portion of dried sludge particles. The sieve includes a diverter for selectively directing a portion of the medium-sized particles between the recycled portion of particles and the collected portion of particles, and a regulator coupled to the diverter for controlling the quantity of medium-sized particles to be recycled.

In one embodiment of the present invention a sieve is provided with a screen having an upper portion with a large mesh and a lower portion with a small mesh. A plate is movably mounted to selectively cover and uncover the one side of the upper screen portion for controlling the amount of medium-sized particles to be either recycled or collected. The plate may be either pivotally or slideably coupled to the sieve.

Another embodiment of the present invention comprises a process for drying sludge to produce granular sludge particles, comprising the steps of introducing a quantity of a sludge mixture of wet sludge and dried sludge particles into a drying zone; supplying hot exhaust air from a furnace zone to the drying zone for absorbing moisture from the sludge to dehydrate the sludge mixture and to produce dried sludge particles; conveying the hot exhaust air with the dried sludge particles entrained therein from the drying zone to a separating zone; separating the hot exhaust air from the dried sludge particles in the separating zone; classifying the dried sludge particles by size into a recycled portion containing fine particles and selectively containing medium-sized particles and a collected portion containing large particles and selectively containing medium-sized particles; regulating the quantity of medium-sized particles to be recycled and the quantity of medium-sized particles to be collected; and mixing the recycled portion of dried sludge particles with wet sludge.

BRIEF DESCRIPTION OF THE DRAWINGS

Referring to the drawings which form part of this disclosure:

FIG. 3 is a side elevational view of the sieve shown in FIG. 2 in the open position and with a portion of the side wall broken away;

FIG. 4 is a side elevational view of the sieve shown in FIG. 3 in the closed position and with a portion of the side wall broken away;

FIG. 7 is a front elevational view of a sieve in accordance with a third embodiment of the invention;

FIG. 8 is a left side elevational view of the sieve shown in FIG. 7; and

FIG. 9 is a right side elevational view of the sieve shown in FIGS. 7 and 8 with portions removed for clarity and with the paths of the particles schematically illustrated.

DETAILED DESCRIPTION OF THE INVENTION

Figure 1:
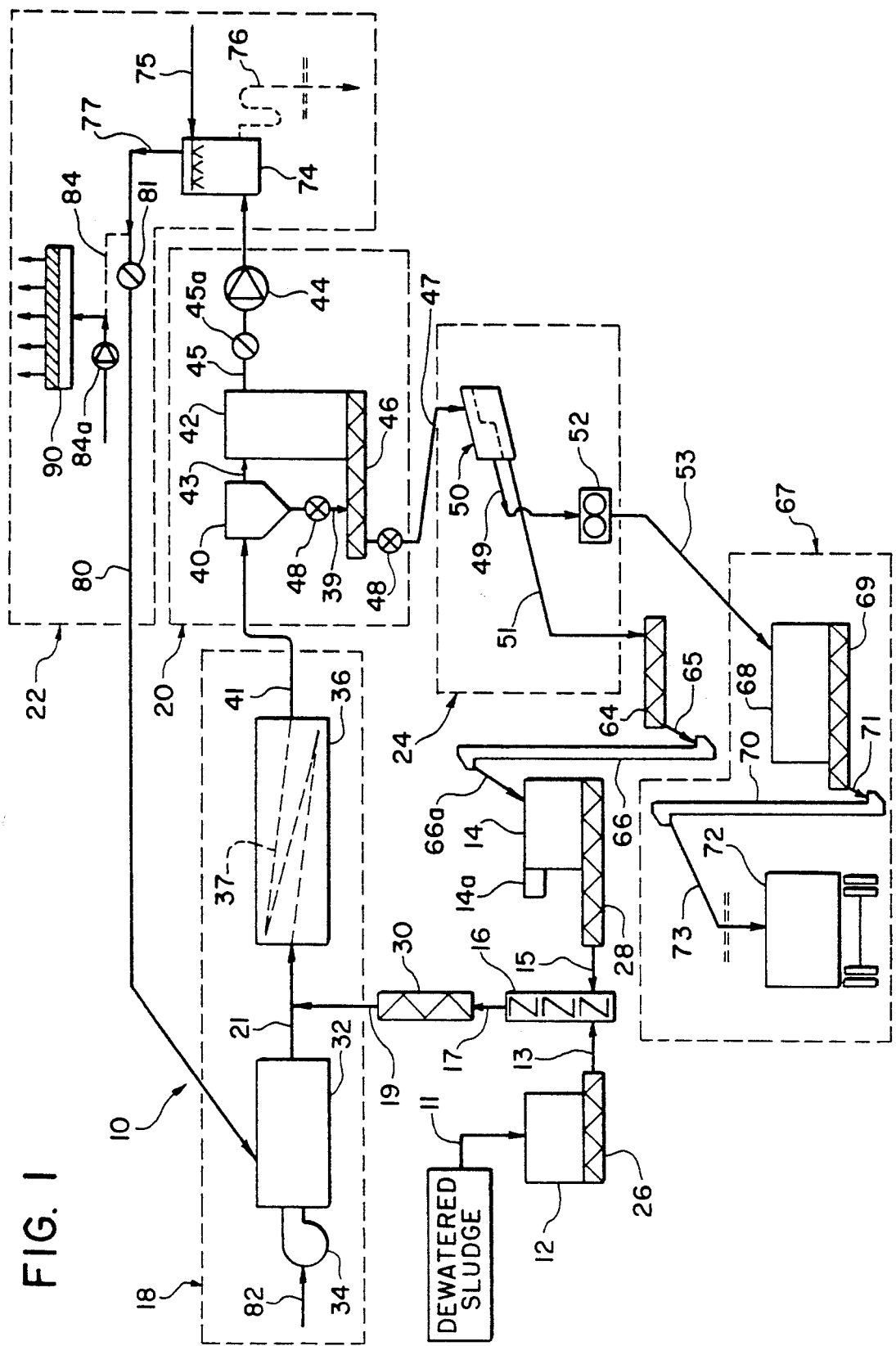
FIG. 1 is a schematic of a sludge drying plant or system in accordance with a first embodiment of the invention.

Although specific terms are used in the following description for the sake of clarity, these terms are intended to refer only to the particular structure of the invention selected for illustration in the drawings and are not intended to define or limit the scope of the invention.

Referring now to the drawings, a sludge drying plant or system 10 is shown in FIG. 1 in accordance with one embodiment of the invention. Sludge drying plant 10 includes wet material silo 12 for receiving mechanically dewatered sludge discharged from a press or centrifuge and introduced into silo 12 by line or duct 11, base material or particle recycling silo 14 for receiving dried particles of sludge produced by plant 10 as nucleuses to form pellets in dryer 36, mixer 16 for mixing wet sludge with dried sludge particles conveyed from silos 12 and 14 by means of lines 13 and 15, drying and pelletizing section 18 for drying the sludge mixture of wet and dried sludge, air-solids separation section 20 coupled to the drying section 18 for removing the solids or sludge particles from the exhaust air or off-gases from drying and pelletizing section 18, exhaust air treatment section 22 for treating the exhaust air from air-solids separation section 20, and classifying section 24 for separating the dried sludge particles according to size.

Mechanically dewatered sludge from municipal wastewater treatment plants, pulp and paper mills, oil refineries, food processing plants, or pharmaceutical manufacturing plants is fed into wet material silo 12 of sludge drying plant 10 by means of line 11. This wet material or wet sludge is then fed via metering screw conveyor 26 and line 13 into mixer 16 where the wet sludge mixes with previously thermally dried sludge particles from base material silo 14, conveyed to mixer 16 by metering screw conveyor 28 and line 15. The sludge mixture of wet and dried sludge is then conveyed by means of line 17, screw conveyor 30 and line 19 to drying section 18.

Drying section 18 includes furnace 32 with burner 34 coupled thereto and rotary drum dryer 36. Hot exhaust air discharged from furnace 32 and the sludge mixture of wet and dried sludge material conveyed by line 19 are introduced by means of line 21 into dryer 36 for removing moisture from the sludge to pelletize the sludge. The moisture from the sludge is absorbed into the hot exhaust air conveyed into dryer 36 from furnace 32. Dryer 36 is preferably a triple pass, rotary drum dryer with the sludge passing therethrough as schematically shown by line 37. Hot exhaust air from furnace 32 is introduced into dryer 36 at a temperature between about 250° C. and about 500° C., preferably up to about 450° C., at a pressure between about −20 mm WC and about −5 mm WC, preferably −10 mm WC. These pressures and other pressures discussed below are expressed in mm WC (millimeters-water column) with (−) indicating a pressure below atmospheric pressure and (+) indicating a pressure above atmospheric pressure.

Dried sludge particles are then discharged from dryer 36 together with hot, wet exhaust air or off-gases by means of line 41, and introduced into air-solids separation section 20 for separating the exhaust air from the sludge particles. The temperature of the exhaust air exiting dryer 36 ranges between about 75° C. and about 100° C., preferably about 90° C. Exhaust air exits dryer 36 at a pressure between about −100 mm WC and about −150 mm WC, preferably about −130 mm WC.

Separation section 20 includes preseparator 40 fluidly coupled to dryer 36 by means of line 41, polycyclone 42 fluidly coupled to preseparator 40 by means of line 43, and feed ventilator or fan 44 fluidly coupled to polycyclone 42 by means of line 45. A valve 45a, such as a flap valve, can be positioned in line 45 to regulate air flow and/or air pressure.

Preseparator 40 separates heavy particles from the exhaust air stream or off-gases exiting dryer 36 via line 41. The exhaust air is discharged from preseparator 40 by means of line 43, while the dried particles are discharged by means of line 39. The exhaust air stream is then conveyed through line 43 to polycyclone 42 for further separation of any remaining dried sludge particles from the exhaust air. The exhaust air exiting polycyclone 42 is substantially completely free of dried sludge particles. Instead of or in addition to the polycyclone 42, a textile filter (not shown) can be used for removing the remaining dried sludge particles in the exhaust air exiting preseparator 40 by means of line 43.

The dried sludge particles are then fed from preseparator 40 and polycyclone 42 to classifying section 24 by means of line 39, delivery screw conveyor 46 and line 47. Cellular sluices 48 are provided in lines 39 and 47 for controlling the flow of dried sludge particles through lines 39 and 47 and for preventing exhaust air from preseparator 40 and polycyclone 42 from entering classifying section 24.

Classifying section 24 includes sieve or classifying screen 50 and crusher or grinding mill 52. Specifically, the dried sludge particles from separation section 20 are fed to screen 50 by means of line 39, delivery screw conveyor 46, line 47 and through cellular sluices 48.

Sieve 50 sorts or classifies dried sludge particles into three size categories, i.e., oversized particles, medium-sized particles and undersized particles.

The undersized dried sludge particles are recycled and mixed with the incoming dewatered sludge. The oversized pellets or dried sludge particles, which are larger than the minimum size for the product are conveyed by line 49 to grinding mill 52. The mediums-sized particles can function as either recycle material or product material. In this case all pellets of the desired product size range fall through grinding mill 52 without being crushed. Thus, the grinding mill is pre-set to crush only the larger or oversized pellets into smaller particles so as to produce pellets in the desired size range.

The product sized pellets are then routed to the product bin. In this process the amount of material to be crushed as well as the amount of material to be recycled are both minimized. This results in a substantial amount of saved energy. To accomplish this process a special sieve 50 is provided which can be controlled to separate the pellets particles to desired size ranges for collection of product material and for diverting enough recycling material to mix with wet sludge to obtain the necessary dry content of the sludge mixture before being transported to the dryer 36.

As seen in FIGS. 3–4, sieve 50 includes a material inlet duct 54 for receiving dried sludge particles from preseparator 40 and polycyclone 42, a first material outlet duct 55 for discharging particles to be collected to mill 52 or a collection bin, and a second material outlet duct 56 for discharging particles to be recycled to base material silo 14. Sieve 50 also includes a screen 57 having an upper portion 58 with a large mesh and a lower portion 59 with a small mesh, and an impervious plate or flap 60 pivotally coupled to sieve 50.

Figure 2:
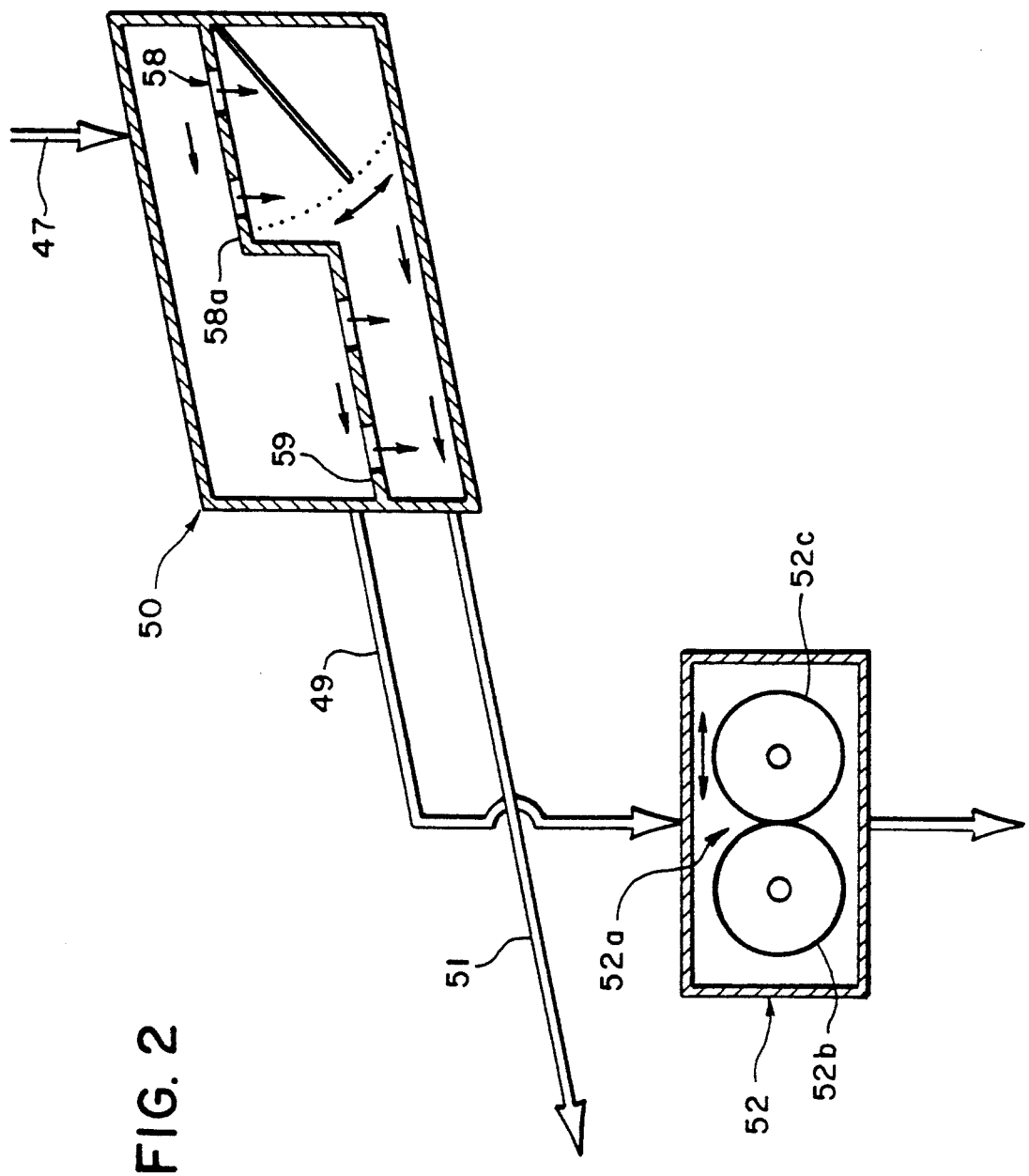
FIG. 2 is a partial, enlarged schematic of a classifying section of the sludge drying plant or system of FIG. 1 with a schematic of the sieve and mill in accordance with the first embodiment of the invention.

As schematically illustrated in FIG. 2, screen portions 58 and 59 together with flap 60 divides the dried sludge particles into three size categories with the undersized particles being recycled, the oversized particles being collected and the medium-sized particles being either recycled or collected depending upon the amount of particles needed as a base material for mixing with the wet sludge. This division of dried sludge particles is advantageous to have available a sufficient amount of particles to form nucleuses for producing granulates or pellets in dryer 36. In particular, system 10 typically does not produce enough undersized particles to meet the amount of base material needed to form nucleuses for producing granulates or pellets. The medium-sized particles can function as either base material or product material. Accordingly, by selectively directing a portion of the medium-sized particles to base material silo 14, a sufficient amount of particles will be provided to form nucleuses for producing granulates or pellets in dryer 36.

Sieve 50 is supported on springs 62 and vibrated by a vibrator 63 during operation to vibrate the dried sludge particles through the screen portions 58 and 59 for dividing the dried sludge into the three size categories.

Upper screen portion 58 with the large mesh has openings ranging, for example, between approximately 0.8 mm up to approximately 2.5 mm, with a preferred range from approximately 1.0 mm to approximately 2.0 mm. Preferably, the openings in screen portion 58 are about 1.5 mm. Thus, upon pivoting flap 60 downwardly to uncover upper screen portion 58, the mediums-sized sludge particles along with the undersized sludge particles pass through upper screen portion 58 to material outlet duct 56. The oversized sludge particles, on the other hand, slide across the upper surfaced of screen portion 58 down% to screen portion 59.

Lower screen portion 59 with the small mesh has openings ranging, for example, between approximately 0.4 mm up to approximately 1.5 mm. Preferably, the openings are about 0.8 mm. Thus, only undersized sludge particles can pass through lower screen portion 59, while the oversized sludge particles and medium-sized sludge particles slide across the upper surface of screen portion 59 to material outlet duct 55.

Preferably, screen portions 58 and 59 are removeably mounted within the housing of sieve 50 so that the operator can change screen portions 58 and 59 with screens having openings of another size. Accordingly, the classifying operation can be adjusted to control the particle size being classified into the three size categories to accommodate the facilities needs.

The amount of medium-sized particles to be recycled is regulated by flap 60 which is pivotally coupled to the housing of sieve 50. Flap 60 is pivoted by a hydraulic or pneumatic cylinder or piston 61. Piston 61 is pivotally coupled at one end to a first lever 61a which is rigidly coupled to flap 60 and pivotally coupled at its other end to a second lever 61b which is rigidly coupled to the housing of sieve 50. Upon extension of piston 61, first lever 61a pivots upwardly causing flap 60 to pivot downwardly, thereby uncovering upper screen portion 58 as seen in FIG. 3. Upon retraction of piston 61, first lever 61a pivots downwardly causing flap 60 to pivot upwardly, thereby covering and overlying screen portion 58 as seen in FIG. 4.

The extension and retraction of piston 61 is controlled by a level sensor 14a in base material silo 14. Accordingly, if the level of base material or recycled particles falls below a predetermined level, a signal is sent to extend piston 61 and to move flap 60 to uncover screen portion 58 so that additional medium-sized particles are sent to base material silo 14. Once the level of particles in base material silo 14 reaches a predetermined level, a signal is sent to retract piston 61 and to move flap 60 to cover screen portion 58 so that the medium-sized particles are sent to mill 52.

As seen in FIG. 4, flap 60 closes substantially all of the area of upper screen portion 58 with the large mesh. A small screen portion 58a of upper screen portion 58 will always remain open to permit at least a few medium-sized particles to pass through screen portion 58a at all times to be recycled as base material for forming pellets or granulates in dryer 36. Preferably, the small screen portion 58a allows for approximately 10% of the total amount of medium-sized particles produced by dryer 36 to continuously pass therethrough for recycling as base material. Alternatively, flap 60 can be designed to completely cover upper screen portion 58 to prevent any dried sludge particles from passing therethrough when flap 60 is in the closed position.

Accordingly, dried sludge particles enter sieve 50 through inlet 54 and are deposited on upper screen portion 58. When flap 60 is pivoted to its open position (FIG. 3), medium-sized sludge particles (preferably 0.8 nun to 1.5 mm) will pass therethrough along with the undersized sludge particles (preferably less than 0.8 mm) for recycling as base material. When flap 60 is pivoted to its closed position (FIG. 4) overlying the underside of upper screen portion 58, the oversized, medium-sized and undersized sludge particles will slide along upper screen portion 58 without passing therethrough until they reach screen portion 58a. Then, some of the medium-sized and undersized sludge particles will pass through small screen portion 58a, while the rest of the sludge particle slide over screen portion 58a, and will then be deposited on lower screen portion 59. The undersized particles (preferably less than 0.8 mm) will then pass through lower screen portion 59 and exit sieve 50 via outlet duct 56. The oversized sludge particles (preferably greater than 1.5 mm) and medium-sized sludge particles, which are larger than the opening in screen portion 59, will slide along screen portion 59 and exit sieve 50 via outlet duct 55.

Referring again to FIG. 2, the oversized and medium-sized particles to be collected are discharged from sieve 50 by means of line 49 and sent to grinding mill 52. The medium-sized sludge particles will pass through mill 52 without being crushed, while the oversized sludge particles will be crushed or reduced to the desired product size.

Mill 52 is a conventional mill with an adjustable crushing gap 52a between crushing rollers 52b and 52c so that the size of the product particles can be controlled. Preferably, crushing gap 52a is set between approximately 3 mm to approximately 5 mm, especially 4 mm, in order to reduce the amount of energy required for crushing the oversized particles. Of course, crushing gap 52a can be set to produce smaller pellets if desired. After crushing, the sludge particles are discharged from mill 52 by means of line 53, and then conveyed to storage system 67.

If the particles to be collected are to be deposited in a landfill, then grinding mill 52 may be omitted. Thus, outlet duct 55 would be coupled directly to storage system 67.

Referring again to FIG. 1, conveyor and storing system 67 includes storing bin 68, screw conveyor 69, and elevator 70. Line 53 discharges the product size particles or pellets into storing bin 68. Then, screw conveyor 69 discharges the product-size particles by means of line 71 to elevator 70, which in turn conveys the product-size particles to vehicle 72 by means of line 73.

The undersized sludge particles and medium-sized sludge particles to be recycled are discharged from sieve 50 by means of line 51. The undersized sludge particles are then sent to base material silo 14 for recycling via conveyor 64 and elevator 66. Specifically, the sludge particles to be recycled are fed via feeding screw conveyor 64 by means of line 65 to elevator 66 and then into base material silo 14 by means of line 66a.

Following the air stream exiting polycyclone 42 via line 45, the hot, wet exhaust air passes through ventilator 44 in line 45 to the exhaust air treatment section 22. Specifically, the hot, wet exhaust air is forced through line 45 into spray condenser 74 by ventilator 44. Spray condenser 74 washes and cools the hot, wet exhaust air by introducing a coolant such as cooling water into spray condenser 74 via duct 75. The water particles in the hot, wet exhaust air are then condensated and discharged from spray condenser 74 together with the cooling water via outlet line or duct 76. The washed and cooled dry exhaust air exits condenser 74 by means of line 77, and is then divided into two exhaust air streams or portions by means of lines 80 and 84 and by a conventional valve or proportioning mechanism. A valve 81 in line 80 regulates the air flow and the air pressure of the exhaust air therethrough.

The hot, wet exhaust air enters condenser 74 by means of line 45 at a temperature between about 75° C. and about 100° C., preferably about 90° C. The pressure in line 45 before ventilator 44 is between about −250 mm WC and about −320 mm WC, preferably −280 mm WC. Ventilator 44 increases the pressure of the hot, wet exhaust air before entering condenser 74. The washed and cooled exhaust air exits condenser 74 by means of line 77 at a temperature between about 45° C. and about 70° C., preferably 55° C., and at a pressure between about +60 mm WC and about +100 mm WC, preferably +80 mm WC.

The larger portion of the exhaust air stream in line 80 is recycled to furnace 32. Preferably, a volume of about 90% of the exhaust air exiting spray condenser 74 is recycled. In furnace 32, the recycled exhaust air is mixed with fresh air entering furnace 32 from duct 82 of burner 34. The mixture of fresh air and recycled exhaust air is then reheated in furnace 32 and conveyed through line 21 to dryer 36 for drying the sludge mixture in dryer 36. Specifically, the washed and cooled exhaust air enters furnace 32 by means of line 80 at a temperature between about 45° C. and about 70° C., preferably 55° C., and at a pressure between about ±0 mm WC and about −10 mm WC, preferably −5 mm WC. The recycled and reheated exhaust air exits furnace 32 by means of line 21 at a temperature between about 250° C. and about 500° C., preferably up to 450° C., and at a pressure between about −20 mm WC and about −5 mm WC, preferably −10 mm WC.

The smaller portion of the exhaust air exiting spray condenser 74 of the exhaust is released to the environment through duct or line 84. Preferably, a volume of about 10% of the exhaust air exiting spray condenser 74 is discharged to the environment. The exhaust air exiting through duct 84 may still contain some organic particles which might not meet environmental regulations because of their odor.

To treat the odor in the exhaust air to be discharged through duct 84, an additional bio-filter 90 can be provided on duct 84 to keep the organic particles from being discharged in the environment. The washed and cooled exhaust air and cooling air added by ventilator 84a exit bio-filter 90 into the environment at a temperature between about 20° C. and about 40° C., preferably 30° C., and at a pressure between about ±0 mm WC and about +40 mm WC, preferably +20 mm WC.

The division of the exhaust air streams between recycling duct 80 and discharging duct 84 can range from a volume percent ratio of recycled exhaust air to discharged exhaust air of from about 65:35 to about 95:5. Preferably, the ratio of recycled exhaust air to the discharged exhaust air is a volume percent ratio in the range of from about 80:20 up to about 95:5. Based on testing, a volume percent ratio of about 90:10 appears to be the optimum ratio for the recycled exhaust air to the discharged exhaust air.

Figures 5, 6:
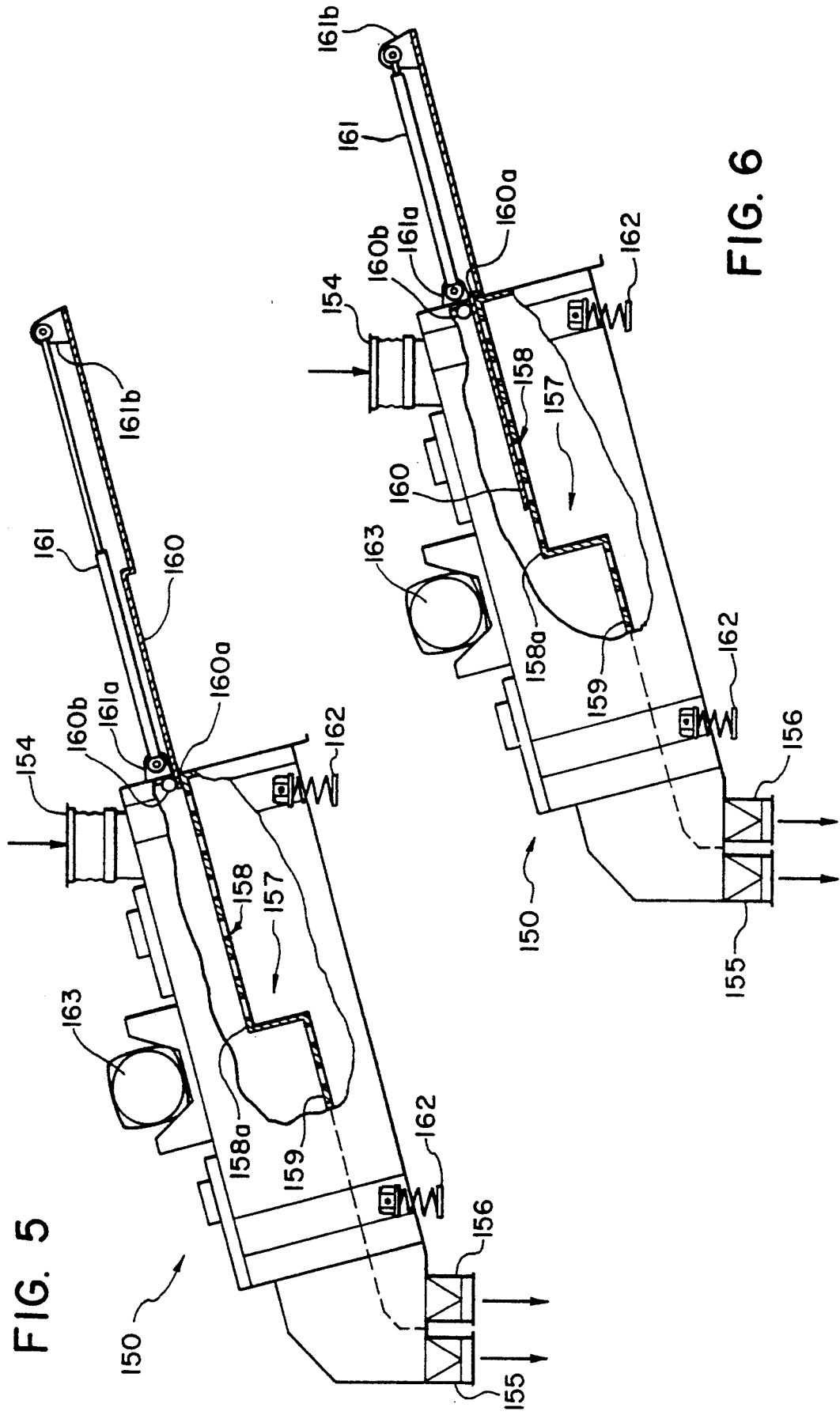
FIG. 5 is a side elevational view of a sieve in the open position for recycling medium-sized particles in accordance with a portion of a second embodiment of the invention and with the side wall broken away.
FIG. 6 is a side elevational view of the sieve of FIG. 5 in the closed position for collecting medium-sized particles and with a portion of the side wall broken away.

Embodiment of FIGS. 5 and 6

FIG. 5 and 6 show another embodiment of a sieve 150 according to the invention which can be used instead of sieve 50 in system 10 as illustrated in FIG. 1. Sieve 150 is substantially identical to sieve 50, except that pivotally mounted flap 60 and piston 61 have been replaced with slideably mounted plate 160 and piston 161 for covering and uncovering the openings in the upper sieve portion. Plate 160 is moved through slot 160a in the housing of sieve 150 to cover and uncover the openings in upper screen portion 158 by a piston 161 which pushes or pulls plate 160 between its open and closed positions.

This embodiment has the advantage that not only can plate 160 be slid to completely uncover screen portion 158, or be slid to mainly closed or cover screen portion 158, but also plate 160 can be maintained in every intermediate position in between the uncovered and covered positions to regulate the amount of particles to be recycled. This allows a better control of the amount of particles to be recycled.

Specifically, as seen in FIGS. 5–6, sieve 150 includes a material inlet duct 154 for receiving dried sludge particles from preseparator 40 and polycyclone 42, a first material outlet duct 155 for discharging particles to be collected to mill 52 or a collection bin, and a second material outlet duct 156 for discharging particles to be recycled to base material silo 14. Sieve 150 also includes a screen 157 having an upper portion 158 with a large mesh and a lower portion 159 with a small mesh, and an impervious plate 160 slidably coupled in slot 160a of sieve 150. A gasket 160b is provided in slot 160a to prevent sludge particles or dust from escaping through slot 160a.

Screen portions 158 and 159 together with flap 160 divides the dried sludge particles into three size categories with the undersized particles being recycled, the oversized particles being collected and the medium-sized particles being either recycled or collected depending upon the amount of particles needed as a base material for mixing with the wet sludge. This division of dried sludge particles is advantageous to have available a sufficient amount of particles to form nucleuses for producing granulates or pellets in dryer 36.

Sieve 150 is supported on springs 162 and vibrated by a vibrator 163 during operation to vibrate the dried sludge particles through the screen portions 158 and 159 for dividing the dried sludge into the three size categories.

Upper screen portion 158 with the large mesh has openings ranging between approximately 0.8 mm up to approximately 2.5 mm, with a preferred range from approximately 1.0 mm to approximately 2.0 mm. Preferably, the openings in screen portion 158 are about 1.5 mm. Thus, upon sliding flap 160 outwardly to uncover upper screen portion 158, the medium-sized sludge particles along with the undersized sludge particles pass through upper screen portion 158 to material outlet duct 156. The oversized sludge particles, on the other hand, slide across the upper surfaced of screen portion 158 down to screen portion 159.

Lower screen portion 159 with the small mesh has openings ranging between approximately 0.4 mm up to approximately 1.5 mm. Preferably, the openings are about 0.8 mm. Thus, only undersized sludge particles can pass through lower screen portion 159, while the oversized sludge particles and medium-sized sludge particles slide across the upper surface of screen portion 159 to material outlet duct 155.

Preferably, screen portions 158 and 159 are removably mounted within the housing of sieve 150 so that the operator can change screen portions 158 and 159 with screens having openings of another size. Accordingly, the classifying operation can be adjusted to control the particle size being classified into the three size categories to accommodate the facilities needs.

The amount of medium-sized particles to be recycled is regulated by plate 160 which is slidably coupled to the housing of sieve 150. Plate 160 is pivoted by a hydraulic or pneumatic cylinder or piston 161. Piston 161 is rigidly coupled at one end to a first lever 161a which is rigidly coupled to plate 160 and rigidly coupled at its other end to a second lever 161b which is rigidly coupled to the housing of sieve 150. Upon extension of piston 161, plate 160 will be pulled outwardly, thereby uncovering upper screen portion 158 as seen in FIG. 5. Upon retraction of piston 161, plate 160 will be pushed inwardly, thereby covering and overlying screen portion 158 as seen in FIG. 6.

The extension and retraction of piston 161 is controlled by a level sensor 14a in base material silo 14. Accordingly, if the level of base material or recycled particles falls below a predetermined level, a signal is sent to extend piston 161 and to move plate 160 to uncover screen portion 158 so that additional medium-sized particles are sent to base material silo 14. Once the level of particles in base material silo 14 reaches a predetermined level, a signal is sent to retract piston 161 and to move plate 160 to cover screen portion 158 so that the medium-sized particles are sent to mill 52.

As seen in FIG. 6, plate 160 closes substantially all of the area of upper screen portion 158 with the large mesh. A small screen portion 158a of upper screen portion 158 will always remain open to permit at least a few medium-sized particles to pass through screen portion 158a at all times to be recycled as base material for forming pellets or granulates in dryer 36. Preferably, the small screen portion 158a allows for approximately 10% of the total amount of medium-sized particles produced by dryer 36 to continuously pass therethrough for recycling as base material. Alternatively, plate 160 can be designed to completely cover upper screen portion 158, to prevent any dried sludge particles from passing therethrough when plate 160 is in the closed position.

Accordingly, dried sludge particles enter sieve 150 through inlet 154 and are deposited on upper screen portion 158. When plate 160 is slid to its open position (FIG. 5), medium-sized sludge particles (preferably 0.8 mm to 1.5 mm) will pass therethrough along with the undersized sludge particles (preferably less than 0.8 mm) for recycling as base material. When plate 160 is slid to its closed position (FIG. 6) overlying the upper surface of upper screen portion 158, the oversized, medium-sized and undersized sludge particles will slide along upper screen portion 158 without passing therethrough until they reach screen portion 158a. Then some of the medium-sized and undersized sludge particles will pass through small screen portion 158a, while the rest of the sludge particle slide over screen portion 158a, and will then be deposited on lower screen portion 159. The undersized particles (preferably less than 0.8 mm) will then pass through lower screen portion 159 and exit sieve 150 via outlet duct 156. The oversized sludge particles (preferably greater than 1.5 mm) and medium-sized sludge particles, which are larger than the opening in screen portion 159, will slide along screen portion 159 and exit sieve 150 via outlet duct 155.

The oversized and medium-sized particles to be collected are discharged from sieve 150 by means of line 49 and sent to grinding mill 52. The medium-sized sludge particles will pass through mill 52 without being crushed, while the oversized sludge particles will be crushed or reduced to the desired product size. After crushing, the sludge particles are discharged from mill 52 by means of line 53, and then conveyed to storage system 67 as discussed above.

If the particles to be collected are to be deposited in a landfill, then grinding mill 52 may be omitted. Thus, outlet duct 155 of sieve 150 would be coupled directly to storage system 67.

The undersized sludge particles and medium-sized sludge particles to be recycled are discharged from sieve 150 by means of line 51. The undersized sludge particles are then sent to base material silo 14 for recycling via conveyor 64 and elevator 66 as discussed above.

Embodiment of FIG. 7–9

Another embodiment of a sieve 250 according to the present invention is shown in FIGS. 7-9. Instead of rectangular sieves 50 and 150 as seen in FIGS. 1-6, a substantially circular tumbling sieve 250 can be used in classifying section 24 as illustrated in FIG. 1.

Sieve 250 includes a material inlet 254 for receiving dried sludge particles from preseparator 40 and polycyclone 42, a first material outlet duct 255 for discharging oversized particles to be collected, a second material outlet duct 256 for discharging undersized particles to be recycled, and a third material outlet duct 257 for discharging mediums-sized particles which are selectively either collected or recycled. Third material outlet duct 257 has a flap valve 260 positioned in duct 257, a first tube 261 coupled between outlet ducts 255 and 257, and a second tube 262 coupled between outlet ducts 256 and 257. Flap valve 260 pivots to direct the medium-sized sludge particles either to tube 261 for collection or to tube 262 for recycling as a base material.

Sieve 250 also includes an upper screen 263 with a small mesh, a middle plate 264 which is impervious, and a lower screen 265 with a large mesh. Upper screen 263 has a passageway 263a positioned at its periphery so that after the undersized particles pass through the small mesh, the medium-sized and oversized particles are spirally conveyed by the tumbling motion of sieve 250 to passageway 263a. The oversized and medium-sized particles then fall through passageway 263a onto lower screen 265.

Accordingly, dried sludge particles enter tumbling sieve 250 through inlet 254 and are deposited on the center of upper screen 263. The tumbling action of sieve 250 moves the particles in a spiral motion from the center of screen 263 towards passageway 263a. Preferably, upper screen 263 is provided with a spiral rib (not shown) extending upwardly therefrom to assist in directing the particles in a spiral motion from the center of screen 263 to passageway 263a. Nearly all undersized sludge particles (preferably less than 0.8 mm) fall through upper screen 263 onto sheet 264 and are then conveyed through duct 256 to base material silo 14 as described above. The oversized and medium-sized particles fall through passageway 263a onto lower screen 265 with larger mesh i.e. 1.5 mm. On screen 265, the oversized sludge particles, i.e., product size, are conveyed by the tumbling motion of sieve 250 to duct 255, and then conveyed to mill 52 and to product storing bin 68 as described above. The medium-sized sludge particles in the size range i.e., 0.8 mm to 1.5 mm, pass through the mesh of lower screen 265 and are drawn off the bottom of sieve 250. The medium-sized particles then fall through duct 257 to flap valve 260.

Flap valve 260 can be adjusted to divide the medium-sized particles so that 10% to 100% are continuously recycled, or on the other hand 90% to 0% are continuously collected as product. Flap valve 260 is controlled by level sensor 14a, which in turn controls the amount of medium-sized particles being recycled. The percentage of medium-sized particles recycled depends on the need for base material to forth pellets or granulates in the dryer. Therefore, the amount of dried sludge particles to be recycled depends on the material to be dried as well as on the properties of the material to be dried, such as moisture, particle size, throughput, temperature, etc.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A sludge drying system, comprising:
   drying means for drying a sludge mixture of dried sludge particles and wet sludge into dried particulate matter, said drying means having inlet means and outlet means;
   means for receiving said dried particulate matter and off gases from said outlet means of said drying means, and for separating said dried particulate matter from said off gases;
   sieve means for separating said dried particulate matter by size into a recycled portion including undersized particles and medium-sized particles and a collected portion including oversized particles and medium-sized particles, said sieve means including entrance means for receiving said dried particulate matter from said gas-solid separating means,
   exit means for discharging said recycled portion of dried sludge particles from said sieve means and for discharging said collected portion of said dried sludge particles from said sieve means,
   diverting means for selectively directing a portion of said medium-sized particles between said recycled portion of said dried sludge particles and said collected portion of said dried particles, and
   regulating means, coupled to said diverting means, for controlling the quantity of said medium-sized particles to be recycled; and
   mixing means for mixing incoming wet sludge with said recycled portion of dried sludge particles.

2. A sludge drying system according to claim 1, further comprising
   crushing means for reducing said oversized particles of said collected portion.

3. A sludge drying system according to claim 1, wherein
   said sieve means includes a first screen having a plurality of openings sized to permit said undersized particles and said medium-sized particles to pass therethrough, and to prevent said oversized particles from passing therethrough; and
   a second screen with a plurality of openings sized to permit said undersized particles to pass therethrough, and to prevent said oversized particles and said medium-sized particles from passing therethrough.

4. A sludge drying system according to claim 3, wherein
   said diverting means includes an impervious plate means for selectively covering and uncovering at least a substantial portion of said first screen to block and unblock at least a substantial portion of said openings in said first screen.

5. A sludge drying system according to claim 4, wherein
   said plate means is pivotally coupled to said sieve means for pivoting between a first position overlying one side of said first screen to block said openings in said first screen, and a second position located remotely from said one side of said first screen to uncover and unblock said openings in said first screen.

6. A sludge drying system according to claim 4, wherein
   said plate means is slidably coupled to said sieve means between a first position overlying one side of said first screen to block said openings in said first screen, and a second position remotely located from said one side of said screen to uncover and unblock said openings in said first screen.

7. A sludge drying system according to claim 4, wherein
   said first screen has a small screen portion which always remains open and uncovered by said plate means to allow a portion of said medium-sized particles to continuously pass therethrough along with a portion of said undersized particles.

8. A sludge drying system according to claim 4, wherein
   said first screen is positioned above said second screen so that said oversized particles slide along the upper surface of said first screen and are deposited on said second screen.

9. A sludge drying system according to claim 4, further comprising
   crushing means for reducing said oversized particles of said collected portion.

10. A sludge drying system according to claim 1, wherein
said sieve means includes a first screen with relatively small openings for permitting only said undersized particles to pass therethrough, a second screen with openings larger than said small openings in said first screen and positioned below said first screen for separating said oversized particles from said medium-sized particles, and a plate positioned between said first and second screens for receiving said undersized materials from said first screen.

11. A sludge drying system according to claim 10, wherein
said exit means includes a first outlet means coupled to said sieve to receive said oversized particles, a second outlet means coupled to said sieve to receive said undersized particles, and a third outlet means to receive said medium sized particles.

12. A sludge drying system according to claim 11, wherein
said diverting means includes a valve means positioned in said third outlet means for directing said medium-sized particles between said collected portion in said first outlet means and said recycled portion in said second outlet means.

13. A process for drying sludge to produce granular sludge particles, comprising the steps of
providing a sludge mixture of wet sludge and dried sludge particles to a drying zone;
supplying hot exhaust gas from a furnace zone to said drying zone for absorbing moisture from said sludge to dehydrate said sludge mixture and to produce dried sludge particles;
conveying said hot exhaust gas with said dried sludge particles entrained therein from said drying zone to a separating zone;
passing said dried sludge particles to a classifying zone;
classifying said dried sludge particles by size into a recycle portion containing undersized particles and selectively containing medium-sized particles, and a product portion containing oversized particles and selectively containing medium-sized particles by regulating and directing a quantity of medium-sized particles to be recycled to said recycle portion and a quantity of medium-sized particles to said product portion; and
mixing said recycle portion of dried sludge particles with incoming wet sludge.

14. A process for drying sludge according to claim 13, further comprising the steps of
conveying said product portion of dried sludge particles to a crusher; and
crushing said oversized particles of said product portion of said dried sludge particles to reduce said oversized particles to a predetermined sized.

15. A process for drying sludge according to claim 13, wherein
said step of regulating and directing includes the step of continuously recycling approximately 10% of the total amount of medium-sized particles produced by said system, and selectively recycling additional amounts of said medium-sized particles as necessary.

16. A process for drying sludge according to claim 15, wherein
the step of classifying includes the step of providing a first sieve zone for selectively separating said dried particles into a stream of said oversized particles and a stream of said medium-sized particles and said undersized particles.

17. A process for drying sludge according to claim 16, wherein
said step of regulating and directing includes using plate means to selectively cover and uncover at least a substantial portion of said first sieve zone.

18. A process for drying sludge according to claim 17, wherein
said first sieve zone selectively per, nits dried sludge particles less than and substantially equal to 1.5 mm to pass therethrough.

19. A process for drying sludge according to claim 18, wherein
said step of classifying includes using a second sieve zone positioned to receive said oversized particles from said first sieve zone.

20. A process for drying sludge according to claim 19, wherein
said second sieve zone permits dried sludge particles lees than about 0.8 mm to pass therethrough, while preventing particles greater than about 0.8 mm from passing therethrough.

21. A process for drying sludge according to claim 13, wherein
the step of classifying includes the steps of providing a first sieve zone for separating said dried particles into a stream of said oversized particles and said medium-sized particles and a stream of said undersized particles; and a second sieve zone for receiving and separating said stream of said oversized and medium-sized particles into a stream of oversized particles and a stream of medium-sized particles.

22. A process for drying sludge according to claim 21, wherein
said step of regulating and directing includes using valve means to selectively divert at least a substantial portion of said stream of medium-sized particles between said stream of undersized particles and said stream of oversized particles.

23. A process for drying sludge according to claim 21, wherein
said first sieve zone permits dried sludge particles smaller than 0.8 mm to pass therethrough to form said stream of undersized particles, while preventing said oversized and mediums-sized particles from passing therethrough to form said stream of oversized and medium-sized particles.

24. A process for drying sludge according to claim 23, wherein
said second sieve zone permits dried sludge particles less than 1.5 mm to pass therethrough.

25. A sieve for separating dried sludge particles, comprising:
a housing with an inlet means for receiving dried sludge particles and an outlet means for discharging dried sludge particles;
sieve means, located in said housing for separating dried sludge particles by size, and sieve including a first screen with large openings and a second screen with small openings; and
diverting means, coupled to said housing, for selectively dried sludge particles having a size smaller than the width of said large openings in said first screen and larger than the width of said small openings to be selectively combined with small dried sludge particles which pass through said second screen and to be selectively combined with the large dried sludge particles which do not pass through said first and second screens.

26. A sieve according to claim 25, wherein said diverting means is a plate movably coupled to said housing to selectively cover and uncover said large openings in said first screen.

27. A sieve according to claim 26, wherein said plate is pivotally coupled to said housing.

28. A sieve according to claim 26, wherein said plate is slideably coupled to said housing.

29. A sieve according to claim 25, wherein said outlet means includes a first duct coupled to said housing to receive large particles which do not pass through said first and second screens, a second duct coupled to said housing to receive small particles Which pass through said second screen, and a third duct coupled to said housing to receive particles which have passed through said first screen.

30. A sieve according to claim 29, wherein said diverting means is a valve positioned in said third duct for selectively directing particles in said third duct to combine with particles in said first duct and said second duct.

* * * * *

UNITED STATES PATENT AND TRADEMARK OFFICE
CERTIFICATE OF CORRECTION

PATENT NO. : 5,318,184
DATED : June 7, 1994
INVENTOR(S) : Georg Krebs

It is certified that error appears in the above-indentified patent and that said Letters Patent is hereby corrected as shown below:

In column 14, line 10, delete "per,nits", and insert -- permits --.

In column 14, line 64, after "selectively", insert -- directing --.

In column 16, line 5, delete "Which", and insert -- which --.

Signed and Sealed this

Eleventh Day of October, 1994

Attest:

BRUCE LEHMAN

*Attesting Officer*     *Commissioner of Patents and Trademarks*